United States Patent
Sui et al.

(10) Patent No.: US 12,547,635 B2
(45) Date of Patent: Feb. 10, 2026

(54) METHOD AND APPARATUS FOR SPATIAL DATA PROCESSING

(71) Applicant: JINGDONG CITY (BEIJING) DIGITS TECHNOLOGY CO., LTD., Beijing (CN)

(72) Inventors: Yuan Sui, Beijing (CN); Xu Wang, Beijing (CN); Junwen Liu, Beijing (CN)

(73) Assignee: JINGDONG CITY (BEIJING) DIGITS TECHNOLOGY CO., LTD., Beijing (CN)

( * ) Notice: Subject to any disclaimer, the term of this patent is extended or adjusted under 35 U.S.C. 154(b) by 41 days.

(21) Appl. No.: 18/136,516

(22) Filed: Apr. 19, 2023

(65) Prior Publication Data
US 2023/0342368 A1    Oct. 26, 2023

(51) Int. Cl.
*G06F 16/2458*    (2019.01)
*G06F 16/22*    (2019.01)

(52) U.S. Cl.
CPC ...... *G06F 16/2458* (2019.01); *G06F 16/2228* (2019.01)

(58) Field of Classification Search
CPC .. G06F 16/2228; G06F 16/2219; G06F 16/22; G06F 16/20; G06F 16/00; G06F 16/2458
See application file for complete search history.

(56) References Cited

U.S. PATENT DOCUMENTS

| | | | |
|---|---|---|---|
| 9,643,796 B2 * | 5/2017 | Koga | B25J 9/1697 |
| 10,191,784 B2 * | 1/2019 | Chen | G06F 9/50 |
| 10,395,419 B1 * | 8/2019 | Godzaridis | G06T 15/30 |
| 11,016,306 B2 * | 5/2021 | Yoshida | G02B 6/0076 |

(Continued)

FOREIGN PATENT DOCUMENTS

| | | |
|---|---|---|
| CN | 110413808 A | 11/2019 |
| CN | 113722314 A | 11/2021 |
| KR | 20210080749 A | 7/2021 |

OTHER PUBLICATIONS

Chinese Patent Office Action for Application No. 202210454595.2 dated Jan. 16, 2025 (3 pages including English machine translation).

(Continued)

*Primary Examiner* — Miranda Le
(74) *Attorney, Agent, or Firm* — Michael Best & Friedrich LLP (57) ABSTRACT

The application discloses a method and apparatus for spatial data processing, and relates to the technical field of data processing. One specific implementation mode of the method comprises: acquiring at least two types of spatial data sets; constructing spatial indexes for the spatial data sets; constructing spatial geometric groups in accordance with the spatial indexes and the at least two types of spatial data sets; placing the spatial geometric groups into a message queue, and subjecting the spatial geometric groups to a spatial correlation calculation by idle threads, which are threads for processing spatial data in the spatial data sets. The implementation mode can effectively balance calculation resources, reduce consumption of the calculation resources, and meanwhile improve a processing efficiency of spatial data.

6 Claims, 6 Drawing Sheets

(56) References Cited

U.S. PATENT DOCUMENTS

| | | | | |
|---|---|---|---|---|
| 11,042,572 B2* | 6/2021 | Mor | ................ | G06F 16/29 |
| 11,361,505 B2* | 6/2022 | Grabner | ................ | G06F 18/22 |
| 11,627,339 B2* | 4/2023 | Cai | ................ | H04N 19/18 |
| | | | | 375/240.18 |
| 11,700,670 B2* | 7/2023 | Chen | ................ | H04W 88/08 |
| | | | | 370/338 |
| 11,710,172 B1* | 7/2023 | Montague | ............ | H04W 4/021 |
| | | | | 705/21 |
| 11,868,136 B2* | 1/2024 | Benisch | ............ | G05D 1/0214 |
| 2015/0205838 A1 | 7/2015 | Statchuk | | |
| 2016/0299929 A1 | 10/2016 | Park et al. | | |
| 2017/0262469 A1* | 9/2017 | Ganti | ................ | G06F 16/9537 |
| 2019/0303451 A1* | 10/2019 | Takahashi | .......... | G06F 16/5866 |
| 2020/0193372 A1* | 6/2020 | Miao | ................ | G06F 16/285 |
| 2021/0183244 A1* | 6/2021 | Malhan | ................ | B64F 1/362 |
| 2021/0256065 A1* | 8/2021 | Behnen | ............ | G06F 16/2228 |
| 2022/0146267 A1* | 5/2022 | Tadi | ................ | G01C 21/3837 |

OTHER PUBLICATIONS

Chinese Patent Office Action for Application No. 202210454595.2 dated May 22, 2024 (5 pages including English machine translation).

* cited by examiner

METHOD AND APPARATUS FOR SPATIAL DATA PROCESSING

CROSS-REFERENCE TO RELATED APPLICATION(S)

This patent application claims priority to Chinese Patent Application No. 202210454595.2, filed on Apr. 24, 2022, the entire contents of which are fully incorporated herein by reference.

TECHNICAL FIELD

The invention relates to the technical field of data processing, and in particular relates to a method and apparatus for spatial data processing.

BACKGROUND ART

In recent years, with the abundance of spatial measurement means, the improvement of measurement precision, and the continuous popularization of spatial-temporal sensors such as GPS and other devices, spatial-temporal data has been used more and more widely. For example, we can monitor land state changes in different areas by processing in a combined manner spatial data such as remote sensing data and land cover data. For another example, a series of efficient parking and pickup locations can be found by means of trajectory data of taxis and state information of the taxis themselves that are correlative, and these parking and pickup locations can be recommended to drivers of available taxis, which ultimately increases the utilization rate of the vehicles. As can be seen, finding out the correlation between different types of spatial data is the basis for further processing or application of the spatial data.

At present, in the process of processing spatial data, it is generally required to perform a cyclic correlative search between a plurality of spatial geometric objects included in two types of spatial data sets to search correlative spatial data, where the spatial geometric object is composed of multiple spatial data. For example, the two types of spatial data sets are respectively A and B, A including spatial geometric objects a1, a2, a3, . . . , and B including spatial geometric objects b1, b2, b3, b4, . . . , each of the spatial geometric objects b1, b2, b3, b4, . . . in B is first subjected to a correlation calculation with the spatial geometric object a1 in A cyclically, and each of the spatial geometric objects b1, b2, b3, b4, . . . in B is then subjected to a correlation calculation with the spatial geometric object a2 in A cyclically, till all the spatial geometric objects in A have been subjected to the correlation calculation with each of the spatial geometric objects in B. The number of the spatial geometric objects included in the spatial data set may be comparatively large, and meanwhile the amount of the spatial data included in the spatial geometric object may be also comparatively large, so the current spatial data processing manner will consume a lot of calculation resources, and meanwhile result in a low processing efficiency of spatial data.

SUMMARY OF THE INVENTION

In view of this, an embodiment of the invention provides a method and apparatus for spatial data processing, which can effectively balance calculation resources, reduce consumption of the calculation resources, and meanwhile improve a processing efficiency of spatial data.

In order to achieve the aforesaid object, according to one aspect of the embodiment of the invention, a method for spatial data processing is provided, the method comprising:
acquiring at least two types of spatial data sets;
constructing spatial indexes for the spatial data sets;
constructing spatial geometric groups in accordance with the spatial indexes and the at least two types of spatial data sets; and
placing the spatial geometric groups into a message queue, and subjecting the spatial geometric groups to a spatial correlation calculation by using idle threads, which are threads for processing spatial data in the spatial data sets.

Optionally, the method for spatial data processing further comprises: determining thread count for processing the spatial data in accordance with the number of the spatial geometric groups, wherein the thread count is less than the number of the spatial geometric groups.

Optionally, the step for constructing spatial indexes for the spatial data sets comprises:
selecting a target spatial data set from the at least two types of spatial data sets; and constructing a multi-level spatial index for the target spatial data set.

Optionally, the step for constructing a multi-level spatial index for the target spatial data set comprises:
constructing virtual circumscribed rectangles for the spatial data included in the target spatial data set;
cyclically performing step S1 and step S2 below:
S1: constructing new virtual circumscribed rectangles for the plurality of virtual circumscribed rectangles in accordance with distances between the respective virtual circumscribed rectangles;
S2: determining whether the new virtual circumscribed rectangles satisfy a cycle stop condition, and if so, constructing the multi-level spatial index using the respective constructed virtual circumscribed rectangles and new virtual circumscribed rectangles, otherwise using the new virtual circumscribed rectangles as the virtual circumscribed rectangles, and performing the step S1.

Optionally, each node included in the multi-level spatial index includes a pointer to the enclosed spatial data; and
the step for constructing spatial geometric groups comprises:
for other spatial data sets than the target spatial data set:
searching a target node overlapping with the other spatial data sets in the multi-level spatial index;
calling the spatial data corresponding to the target node by using the pointer of the target node; and
combining the spatial data corresponding to the target node and the spatial data related to the target node in the other spatial data sets to form the spatial geometric groups.

Optionally, the method or spatial data processing further comprises:
storing the calculation results of the spatial geometric groups in a result storage container; and
determining a location and/or distribution of a target to be analyzed included in the spatial data based on the calculation results stored in the result storage container.

Optionally, the spatial data included in the target spatial data set is two-dimensional data or three-dimensional data.

Optionally, the cycle stop condition comprises:
the number of the new virtual circumscribed rectangles being not greater than a preset number threshold; or, the number of layers of the existing virtual circumscribed rectangles satisfying requirements of the multi-level spatial index.

According to a second aspect, the embodiment of the invention provides an apparatus for spatial data processing, comprising: an acquiring module, an index constructing module and a processing module, wherein the acquiring module is used for acquiring at least two types of spatial data sets;

the index constructing module is used for constructing spatial indexes for the spatial data sets; and the processing module is used for constructing spatial geometric groups in accordance with the spatial indexes and the at least two types of spatial data sets; and placing the spatial geometric groups into a message queue, and subjecting the spatial geometric groups to a spatial correlation calculation by using idle threads, which are threads for processing spatial data in the spatial data sets.

The one embodiment in the invention has the following advantages and beneficial effects: by constructing spatial indexes and spatial geometric groups for at least two types of spatial data sets, a one-to-one comparison of irrelevant spatial data included in different spatial data sets is avoided, and then by placing the spatial geometric groups into a message queue, and subjecting the spatial geometric groups to a spatial correlation calculation by using idle threads among a plurality of threads for processing spatial data, the idle threads are made to actively acquire the spatial geometric groups to avoid a problem of unbalanced calculation allocations to different threads, which can effectively balance calculation resources, reduce consumption of the calculation resources, and meanwhile improve a processing efficiency of spatial data.

Further effects of the aforesaid non-conventional optional manners will be described below in combination with specific implementation modes.

BRIEF DESCRIPTION OF THE DRAWINGS

Figures are used to better understand the invention, and do not form improper limitations of the invention. Where.

DETAILED DESCRIPTION

The exemplary embodiments of the invention, including various details of the embodiments of the invention, are described below in combination with the figures to facilitate understanding, and shall be considered to be exemplary ones only. Thus, those skilled in the art should recognize that various changes and modifications may be made to the embodiments described herein without departing from the scope and spirit of the invention. Similarly, for clarity and conciseness, descriptions of well-known functions and structures are omitted in the descriptions below.

Figure 1:
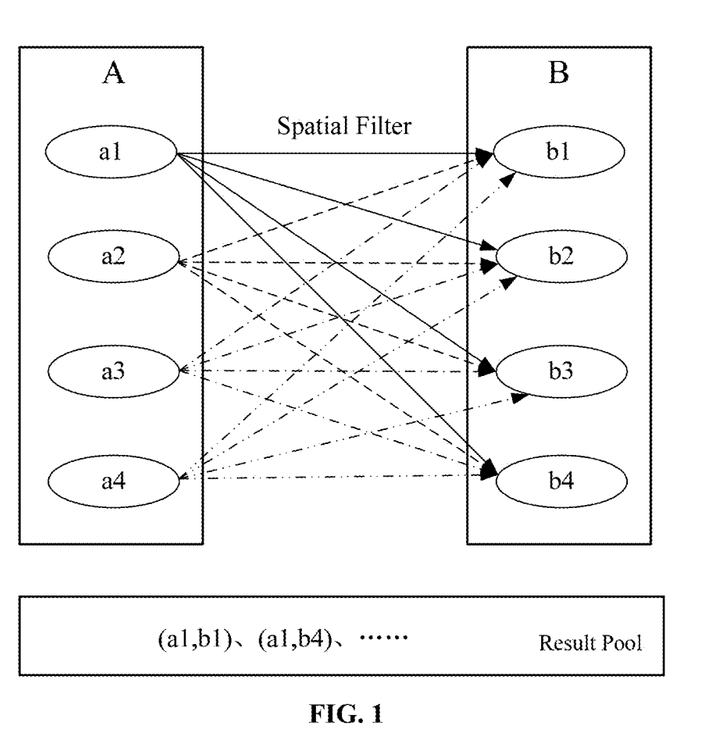
FIG. 1 is a schematic diagram of a structure for spatial data processing according to the prior art.
Figure 2:
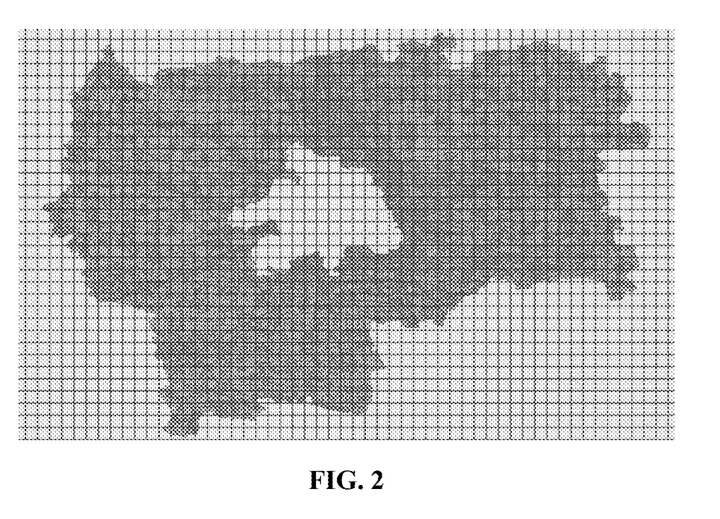
FIG. 2 is a schematic diagram of a relationship between spatial geometric objects in two spatial data sets according to the prior art.

In the prior art, for example, there are two spatial data sets, and the processing of the spatial data may be as shown in FIG. 1 and FIG. 2. As shown in FIG. 1, there are two spatial data sets A and B, where the spatial geometric objects included in the spatial data set A are composed of two-dimensional spatial data of longitudes and latitudes, which are used to indicate business districts, plot areas, lands, illegal construction areas, or the like of the city; the spatial geometric objects included in the spatial data set B are composed of three-dimensional spatial data of buildings or landmarks (the three-dimensional spatial data generally includes the coordinates of the spatial distribution points of the buildings or landmarks). In order that the distribution of a certain type of buildings such as residential buildings included in a certain business district, or buildings included in an illegal construction area can be searched, it is required in the prior art to combine the spatial geometric objects composed of all the spatial data in the two spatial data sets A and B in pairs. That is, as shown in FIG. 1, the spatial geometric objects a1, a2, a3 and a4 included in the spatial data set A are respectively paired with the spatial geometric objects b1, b2, b3 and b4 included in the spatial data set B, i.e., a1 is paired with b1, b2, b3 and b4, respectively, a2 is paired with b1, b2, b3 and b4, respectively, a3 is paired with b1, b2, b3 and b4, respectively, and a4 is paired with b1, b2, b3 and b4, respectively. Then, spatial judgment operations, i.e., Spatial Filter as shown in FIG. 1, are performed on each of the paired combinations (a1, b1), (a1, b2), (a1, b3), (a1, b4), (a2, b1), (a2, b2), (a2, b3), (a2, b4), (a3, b1), (a3, b2), (a3, b3), (a3, b4), (a4, b1), (a4, b2), (a4, b3), and (a4, b4). There are many spatial judgment operations, such as a geometric intersection judgment and a spatial inclusion judgment. The combinations that satisfy the judgment requirements will be finally stored in a result storage container Result Pool. For example, the paired combinations (a1, b1), (a1, b4), (a2, b2), and (a3, b3) in FIG. 1 are found to satisfy the judgment requirements after being subjected to the spatial judgment operations, and then the paired combinations (a1, b1), (a1, b4), (a2, b2), and (a3, b3) are stored in the result storage container Result Pool. Because the spatial geometric object may be composed of a large amount of spatial data, the most time-consuming part of the all operation process is the process of performing the spatial judgment operations (Spatial Filter) on each paired combination, because this step of the spatial judgment operations requires a lot of geometric operations, and the more complex the geometric figure is, the longer the time for the Spatial Filter is.

Thus, all the optimizations on Spatial Join are to reduce the Spatial Filter operations on the paired combinations as far as possible, or to perform these operations concurrently. The calculation manner as shown in FIG. 1 is the most direct one, which performs cyclic calculations on the spatial geometric objects in the two spatial data sets in pairs. For example, if a spatial data set grid has m spatial geometric objects, and another spatial data set dbfg has n spatial geometric objects, the complexity of processing spatial data based on the method as shown in FIG. 1 is O(m*n). This is because the method given in FIG. 1 is not subjected to any optimized processing, and will also perform calculations on many spatial geometric objects having no possibility of being intersected (very far away in space), which results in a waste of calculation resources such as CPU and GPU.

However, for the two spatial data sets grid and dbfg as shown in FIG. 2, the spatial data set grid is land grid data of longitudes and latitudes with a total of 2,090 spatial geometric objects, and the spatial data set dbfg includes spatial geometric objects composed of land cover data with a total of 41,011 spatial geometric objects. The spatial distribution of the two overlapped spatial data sets grid and dbfg is as shown in FIG. 2. It is found upon exploration that there are a lot of complex spatial geometric objects in the dbfg data. The so-called complex spatial geometric object means that the internal geometric figure is composed of a large amount of node spatial data, and the spatial distribution is very irregular. For example, a single spatial geometric object in dbfg may include more than 100,000 node spatial data, and one spatial geometric object occupies ¼ of the entire spatial range. If the spatial data processing is still performed in the aforesaid implementation mode as shown in FIG. 1, a lot of calculation resources will be consumed.

In order to solve the aforesaid problem, the embodiment of the invention provides a method and apparatus for spatial data processing.

Figure 3:
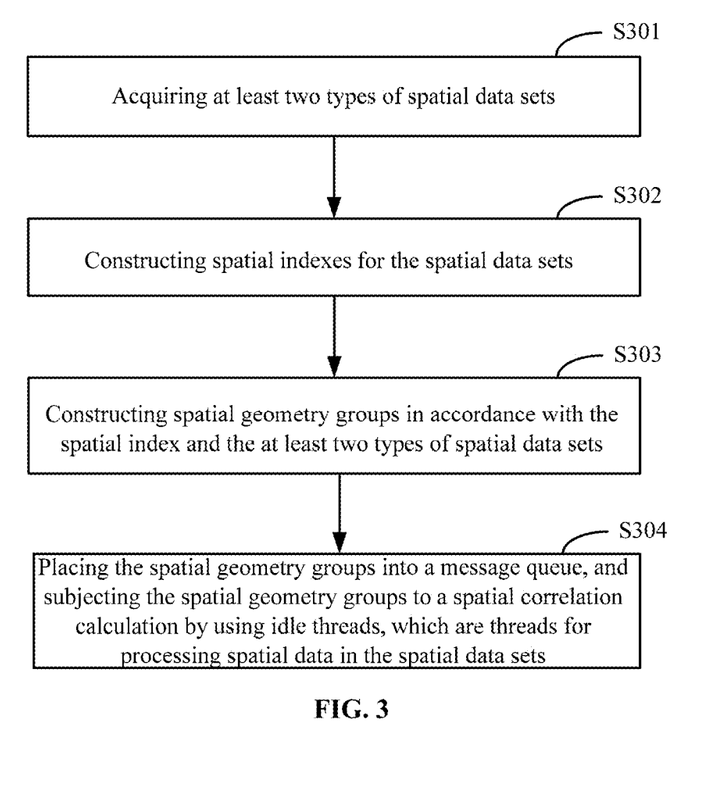
FIG. 3 is a schematic diagram of a main flow of a method for spatial data processing according to an embodiment of the invention.

FIG. 3 is a method for spatial data processing according to an embodiment of the invention, and as shown in FIG. 3, the method for spatial data processing may comprise the following steps:

Step S301: acquiring at least two types of spatial data sets;

Wherein each type of spatial data sets may include spatial data and a plurality of spatial geometric objects composed of spatial data; the spatial geometric objects may be buildings, roads, districts, and the like.

The at least two types of spatial data sets are generally from different data sources. For example, in order to determine parking spots of taxis in various business districts, it is required to match the business district spatial data divided according to business requirements and the taxi driving trajectory data obtained from the taxi platforms, wherein the business district spatial data belongs to one type of spatial data sets, and the spatial data composed of the taxi driving trajectory data belongs to another type of spatial data sets. For another example, with respect to the determination of the illegal constructions in each district, the spatial data of the distribution in each district can be matched with spatial data of various buildings and spatial data of building types, where the spatial data of the distribution in each district belongs to one type of spatial data sets, the spatial data of various buildings belongs to another type of spatial data sets, and the spatial data of various building types belongs to a third type of spatial data sets. The types of the spatial data included in these different types of spatial data sets are generally different, and correspondingly, the structures of the spatial geometric objects composed of these spatial data are also generally different. As shown in FIG. 2, the spatial geometric objects composed of some spatial data are grids, while the spatial geometric objects composed of some spatial data are complex shapes. However, there is a certain overlap in space between different spatial data sets (i.e., there may be a spatial coordinate overlap between spatial geometric objects composed of the respective spatial data included in different spatial data sets).

Step S302: constructing spatial indexes for the spatial data sets;

The spatial index is a directory for retrieving and positioning spatial geometric objects composed of the spatial data of the spatial data set.

The specific implementation mode of constructing spatial indexes for the spatial data sets in this step may be as follows: constructing a spatial index for any type of spatial data sets or constructing a spatial index for a selected target spatial data set. That is, by constructing a spatial index for one type of spatial data sets, the efficiency of constructing spatial geometric groups in subsequent steps can be effectively improved.

Step S303: constructing spatial geometric groups in accordance with the spatial indexes and the at least two types of spatial data sets;

Wherein, at least two spatial geometric objects composed of the spatial data included in one spatial geometric group belong to different spatial data sets.

For example, (a1, b1), (a1, b4) and the like as shown in FIG. 1 can be the constructed spatial geometric groups.

Step S304: placing the spatial geometric groups into a message queue, and subjecting the spatial geometric groups to a spatial correlation calculation by using idle threads, which are threads for processing spatial data in the spatial data sets.

The plurality of threads for processing spatial data achieves monitoring the spatial geometric groups in the message queue by subscribing to the message queue. Generally speaking, each time one spatial geometric group is obtained in the aforesaid step S303, it is placed into the message queue, and at this time, the idle threads can know that there are unprocessed spatial geometric groups in the message queue for they subscribe to the message queue, so the idle threads process the spatial geometric groups. By means of this process, the accumulation of the spatial geometric groups in the message queue can be avoided as far as possible, and meanwhile the aforesaid steps S303 and S304 can be performed synchronously. For example, in step S303, a spatial geometric group 1 is constructed first, the spatial geometric group 1 is placed into the message queue, and an idle thread X1 processes the spatial geometric group 1, in subsequent step S303, a spatial geometric group 2 is constructed, the spatial geometric group 2 is placed into the message queue, and an idle thread X2 processes the spatial geometric group 2, and so on.

Wherein, the thread count for processing spatial data may be determined in accordance with the number of the spatial geometric groups, wherein thread count is less than the number of the spatial geometric groups. That is, in order to avoid a problem that some threads process too large an amount of data, while other threads process too small an amount of data, by arranging that thread count is less than the number of the spatial geometric groups, the threads processing the spatial geometric groups having comparatively small amounts of data are enabled to process more spatial geometric groups so as to effectively balance the calculation amounts of the respective threads and prevent the threads from being idle for a long time.

In the embodiment as shown in FIG. 3, by constructing spatial indexes and spatial geometric groups for at least two types of spatial data sets, a comparison of the spatial geometric objects composed of the spatial data in different spatial data sets in pairs is avoided, and then by placing the spatial geometric groups into a message queue, and subjecting the spatial geometric groups to a spatial correlation calculation by using idle threads among a plurality of threads for processing spatial data, the idle threads are made to actively acquire the spatial geometric groups to avoid a problem of unbalanced calculation allocations to different threads, which can effectively balance calculation resources, reduce consumption of the calculation resources, and meanwhile improve a processing efficiency of spatial data.

In addition, a thread pool will read geometric pairs of spatial geometric objects composed of the spatial data in a candidate pool in real time to ensure that all the threads are performing calculations, and once the calculations are completed, new geometric pairs will be acquired. In this way, within a global range, the thread pool resources will be fully utilized, and no idle threads will be resulted in.

In the embodiment of the invention, the aforesaid specific implementation mode of constructing spatial indexes for the spatial data sets may comprise: selecting a target spatial data set from the at least two types of spatial data sets; and constructing a multi-level spatial index for the target spatial data set, wherein the spatial data included in the target spatial data set is two-dimensional data or three-dimensional data. In order to effectively improve the preliminary screening efficiency, the selected target spatial data set is generally a spatial data set including the largest amount of the spatial data, or the selected target spatial data set is a spatial data set including comparatively complex spatial geometric objects.

Figure 4:
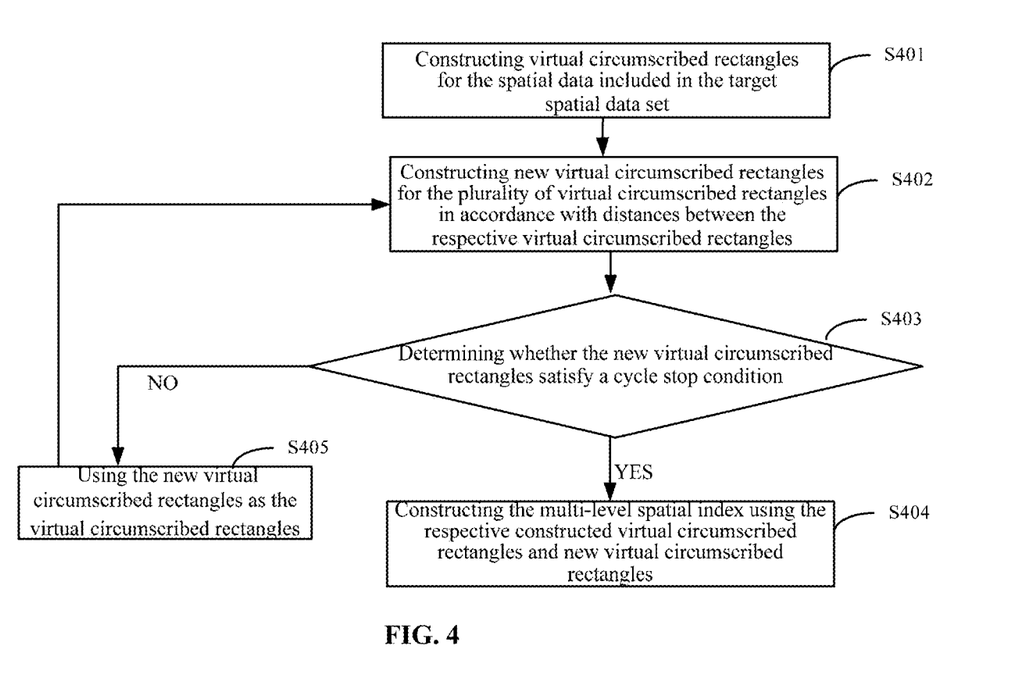
FIG. 4 is a schematic diagram of a main flow of constructing a multi-level spatial index for a target spatial data set according to an embodiment of the invention.

In the embodiment of the invention, as shown in FIG. 4, the aforesaid specific implementation mode of constructing a multi-level spatial index for the target spatial data set may comprise the following steps:

Step S401: constructing virtual circumscribed rectangles for the spatial data included in the target spatial data set;

The essence of the step is to construct a virtual circumscribed rectangle for each spatial geometric object composed of the spatial data.

Figure 5:
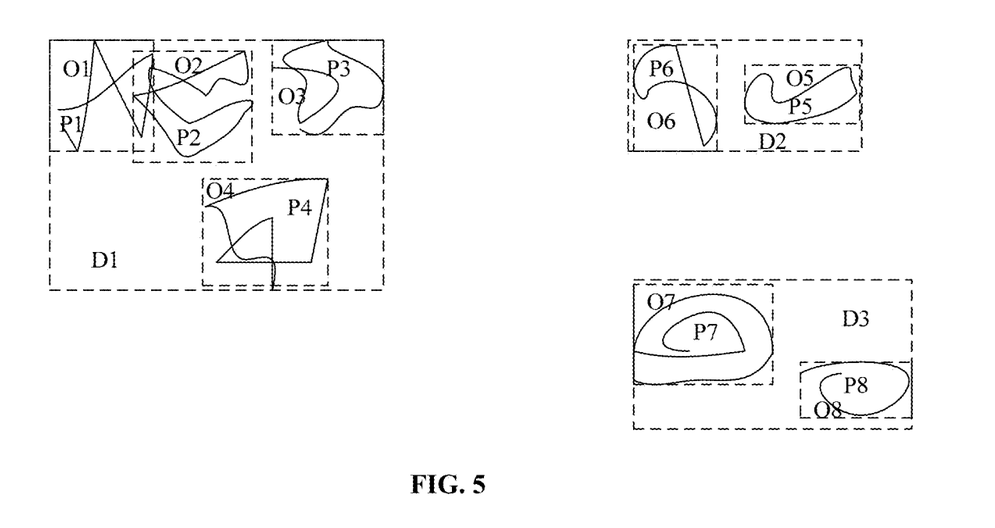
FIG. 5 is a schematic diagram of a relative positional relationship between spatial geometric objects and virtual circumscribed rectangles according to an embodiment of the invention.

As for part of the spatial geometric objects P1, P2, P3, P4, P5, P6, P7 and P8 composed of the spatial data in one target spatial data set as shown in FIG. 5, their respective corresponding virtual circumscribed rectangles are O1, O2, O3, O4, O5, O6, O7 and O8, and it can be seen from FIG. 5 that the virtual circumscribed rectangles are constructed based on the maximum and minimum values of the spatial geometric objects.

Step S402: constructing new virtual circumscribed rectangles for the plurality of virtual circumscribed rectangles in accordance with distances between the respective virtual circumscribed rectangles;

The distances can be correspondingly set according to actual requirements. For example, a new virtual circumscribed rectangle is constructed for a plurality of virtual circumscribed rectangles that are overlapped. For another example, a new virtual circumscribed rectangle is constructed for a plurality of virtual circumscribed rectangles whose distances are less than a set distance threshold. As shown in FIG. 5, a new virtual circumscribed rectangle D1 is constructed for O1, O2, O3 and O4, a new virtual circumscribed rectangle D2 is constructed for O5 and O6, and a new virtual circumscribed rectangle D3 is constructed for O7 and O8.

Step S403: determining whether the new virtual circumscribed rectangles satisfy a cycle stop condition, and if so, performing the step S404; otherwise performing the step S405;

The cycle stop condition in this step may comprise: the number of the new virtual circumscribed rectangles being not greater than a preset number threshold; or, the number of layers of the existing virtual circumscribed rectangles satisfying requirements of the multi-level spatial index.

For example, if the preset number threshold is 1, since the total number of D1, D2 and D3 obtained above is 3 that is greater than 1, it is required to use D1, D2 and D3 as virtual circumscribed rectangles to perform the cycle again. If the preset number threshold is 3, since the total number of D1, D2 and D3 obtained above is 3, the cycle is stopped.

For another example, if the required number of layers of the multi-level spatial index is 3, since the number of layers of the existing virtual circumscribed rectangles is also 3, the cycle is stopped.

Figure 6:
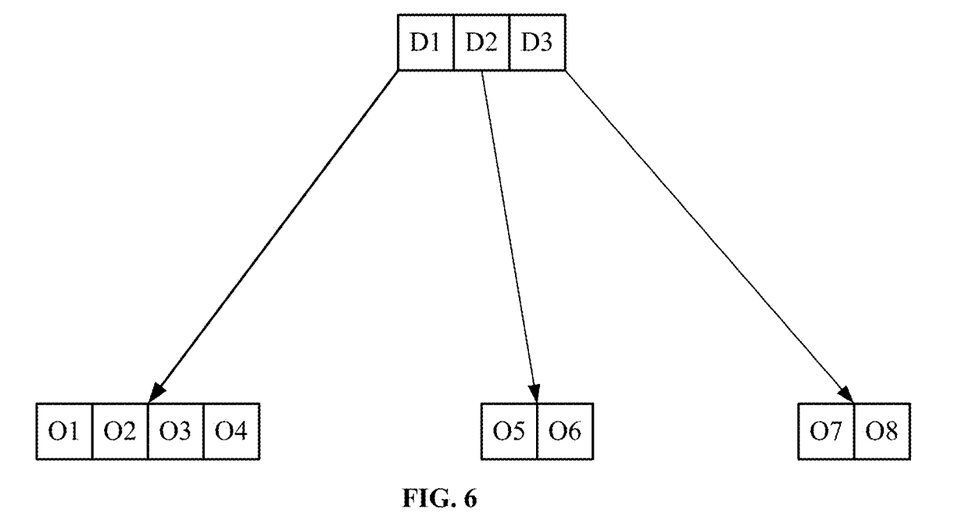
FIG. 6 is a schematic diagram of a structure of a multi-level spatial index according to an embodiment of the invention.

Step S404: constructing the multi-level spatial index using the respective constructed virtual circumscribed rectangles and new virtual circumscribed rectangles, and ending the current flow;

The constructed multi-level spatial index is shown in FIG. 6, root nodes of the multi-level spatial index include D1, D2 and D3, the node D1 corresponds to leaf nodes O1, O2, O3 and O4, the node D2 corresponds to leaf nodes O5 and O6, and the node D3 corresponds to leaf nodes O7 and O8. Wherein each node included in the multi-level spatial index includes a pointer to the enclosed spatial geometric object; the pointer can directly call the spatial data corresponding to the spatial geometric object from the memory or storage space.

Step S405: using the new virtual circumscribed rectangles as the virtual circumscribed rectangles, and performing the step S402.

Figure 7:
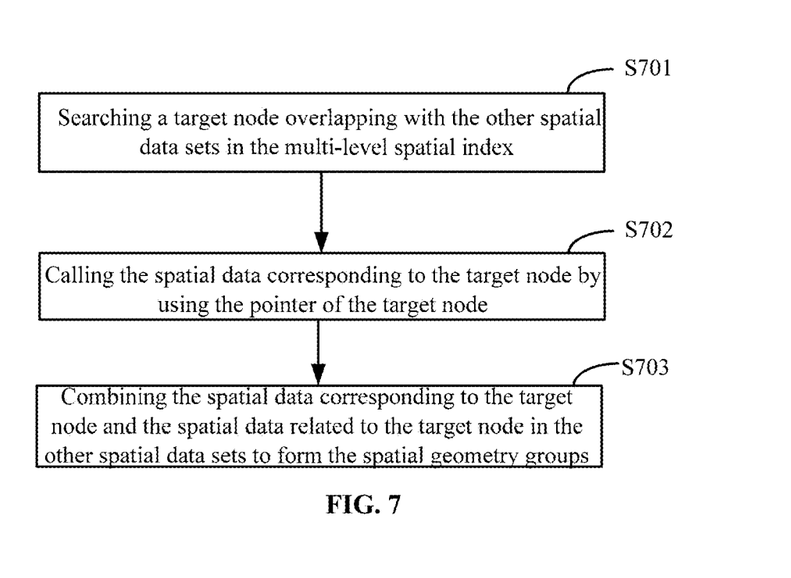
FIG. 7 is a schematic diagram of a main flow of preliminarily screening out spatial geometric groups according to an embodiment of the invention.

In the embodiment of the invention, each node included in the multi-level spatial index includes a pointer to the enclosed spatial data or the enclosed spatial geometric object composed of the spatial data; correspondingly, as shown in FIG. 7, the aforesaid specific implementation mode of preliminarily screening out spatial geometric groups from the at least two types of spatial data sets may comprise the following steps:

Step S701 is performed for other spatial data sets than the target spatial data set:

Step S701: searching a target node overlapping with the other spatial data sets in the multi-level spatial index;

The essence of searching a target node overlapping with the other spatial data sets is to search a target node overlapping with the spatial geometric objects composed of the spatial data in the other spatial data sets.

For example, the multi-level spatial index as shown in FIG. 6 is constructed from the spatial geometric objects composed of the spatial data included in the spatial data set B, it is first determined from D1, D2 and D3 that the node that overlaps in space with the spatial geometric object 1 in the other spatial data set A is, for example, D1, and then it is subsequently found from the leaf nodes O1, O2, O3 and O4 under D1 that the leaf nodes that overlap in space with the spatial geometric object 1 in the other spatial data set A are, for example, O1 and O2, so the spatial geometric object 1 is combined with the spatial geometric objects corresponding to O1 and O2, respectively to form spatial geometric groups.

Step S702: calling the spatial data corresponding to the target node by using the pointer of the target node;

Step S703: combining the spatial data corresponding to the target node and the spatial data related to the target node in the other spatial data sets to form the spatial geometric groups.

The establishment of a multi-level spatial index can facilitate expedited construction of spatial geometric groups. In the process of retrieving by the multi-level spatial index, the objects that are not found by query by any spatial geometric object in other spatial data sets in the multi-level spatial index will not be matched with the other spatial data sets, so most of the data are filtered out. In addition, because the retrieval of the multi-level spatial index performs calculations using the virtual circumscribed rectangles, rather than the Spatial Filter that is accurate, the constructing or screening efficiency of the spatial geometric groups can be further improved.

In the embodiment of the invention, the aforesaid method for spatial data processing may further comprise: storing the calculation results of the spatial geometric groups in a result storage container; and determining a location and/or distribution of a target to be analyzed included in the spatial data based on all the calculation results of the at least two types of spatial data sets stored in the result storage container. The target to be analyzed may be buildings on illegal lands, taxi parking spots, distribution of rivers on land, locations of electric vehicle charging piles, distribution of residential buildings in business districts, and the like.

Figure 8:
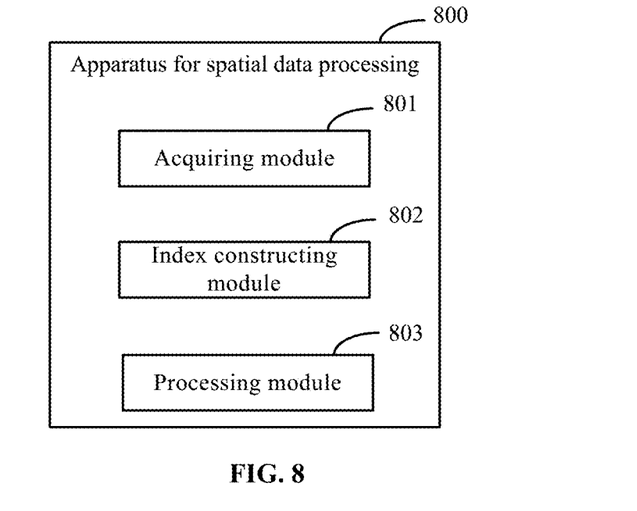
FIG. 8 is a schematic diagram of main modules of an apparatus for spatial data processing according to an embodiment of the invention.

As shown in FIG. 8, the embodiment of the invention provides an apparatus 800 for spatial data processing. The apparatus 800 for spatial data processing may comprise: an acquiring module 801, an index constructing module 802 and a processing module 803, wherein, the acquiring module 801 is used for acquiring at least two types of spatial data sets; the index constructing module 802 is used for constructing spatial indexes for the spatial data sets; and the processing module 803 is used for constructing spatial geometric groups in accordance with the spatial indexes and the at least two types of spatial data sets; placing the spatial geometric groups into a message queue, and subjecting the spatial geometric groups to a spatial correlation calculation by using idle threads, which are threads for processing spatial data in the spatial data sets.

In the embodiment of the invention, the processing module 803 is further used for determining the thread count for processing spatial data in accordance with the number of the spatial geometric groups, wherein the thread count is less than the number of the spatial geometric groups.

In the embodiment of the invention, the index constructing module 802 is further used for selecting a target spatial data set from the at least two types of spatial data sets; and constructing a multi-level spatial index for the target spatial data set.

In the embodiment of the invention, the index constructing module 802 is further used for constructing virtual circumscribed rectangles for the spatial data included in the target spatial data set; and cyclically performing step S1 and step S2 below:

S1: constructing new virtual circumscribed rectangles for the plurality of virtual circumscribed rectangles in accordance with distances between the respective virtual circumscribed rectangles;

S2: determining whether the new virtual circumscribed rectangles satisfy a cycle stop condition, and if so, constructing the multi-level spatial index using the respective constructed virtual circumscribed rectangles and new virtual circumscribed rectangles, otherwise using the new virtual circumscribed rectangles as the virtual circumscribed rectangles, and performing the step S1.

In the embodiment of the invention, each node included in the multi-level spatial index includes a pointer to the enclosed spatial data; the processing module 803 is further used for, for other spatial data sets than the target spatial data set: searching a target node overlapping with the other spatial data sets in the multi-level spatial index; calling the spatial data corresponding to the target node by using the pointer of the target node; and combining the spatial data corresponding to the target node and the spatial data related to the target node in the other spatial data sets to form the spatial geometric groups.

In the embodiment of the invention, the processing module 803 is further used for storing the calculation results of the spatial geometric groups in a result storage container; and determining a location and/or distribution of a target to be analyzed included in the spatial data based on all the calculation results of the at least two types of spatial data sets stored in the result storage container.

In the embodiment of the invention, the spatial data included in the target spatial data set is two-dimensional data or three-dimensional data.

In the embodiment of the invention, the cycle stop condition of the index constructing module 802 comprises:

the number of the new virtual circumscribed rectangles being not greater than a preset number threshold; or, the number of layers of the existing virtual circumscribed rectangles satisfying requirements of the multi-level spatial index.

It shall be noted that the aforesaid apparatus for spatial data processing may be applied to a terminal device or a server.

The contents below take an application of a method for spatial data processing or an apparatus for spatial data processing to a server as an example to give expanded descriptions of the system architecture of the method for spatial data processing or the apparatus for spatial data processing provided by the embodiment of the invention.

Figure 9:
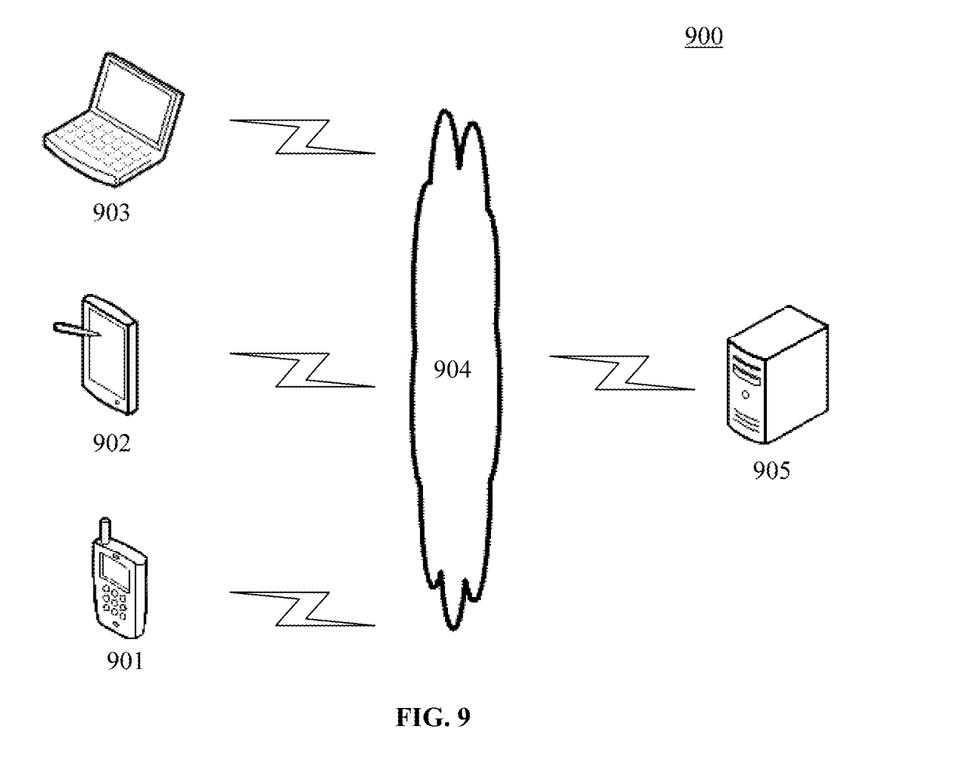
FIG. 9 is an exemplary system architecture diagram to which an embodiment of the invention can be applied.

FIG. 9 shows an exemplary system architecture 900 to which a method for spatial data processing or an apparatus for spatial data processing according to an embodiment of the invention can be applied.

As shown in FIG. 9, the system architecture 900 may comprise terminal devices 901, 902 and 903, a network 904, and a server 905 (only examples). The network 904 is a medium for providing a communication link between the terminal devices 901, 902 and 903 and the server 905. The network 904 may include various connection types, such as wired or wireless communication links, or fiber-optic cables.

The user may use the terminal devices 901, 902 and 903 to interact with the server 905 through the network 904 to receive or send messages and so on. For example, a request for processing spatial data is sent to the server 905, and a spatial data processing result with respect to the request for processing spatial data sent by the server 905 is received. Various communication client applications, such as space surveying and mapping applications, positioning applications, web browser applications, search applications, instant messaging tools, email clients, social platform software, and so on (only examples), may be installed on the terminal devices 901, 902 and 903.

The terminal devices 901, 902 and 903 may be various electronic devices having screens and supporting web browsing, including but not limited to smart phones, tablet computers, laptop portable computers, desktop computers, and so on.

The server 905 may be a server that provides various services, such as a background management server that provides support for spatial data requested by the user using the terminal devices 901, 902 and 903 (only an example). The background management server may process, for example, analyze the spatial data, and feed the processing results (such as the locations of the target buildings and the distribution of the target buildings—only examples) back to the terminal devices.

It shall be noted that the method for spatial data processing provided by the embodiment of the invention is generally performed by the server 905, and correspondingly, the device for spatial data processing is generally provided in the server 905.

It should be understood that the numbers of the terminal devices, the networks, and the servers in FIG. 9 are merely schematic. According to implementation requirements, there may be any numbers of terminal devices, networks, and servers.

Figure 10:
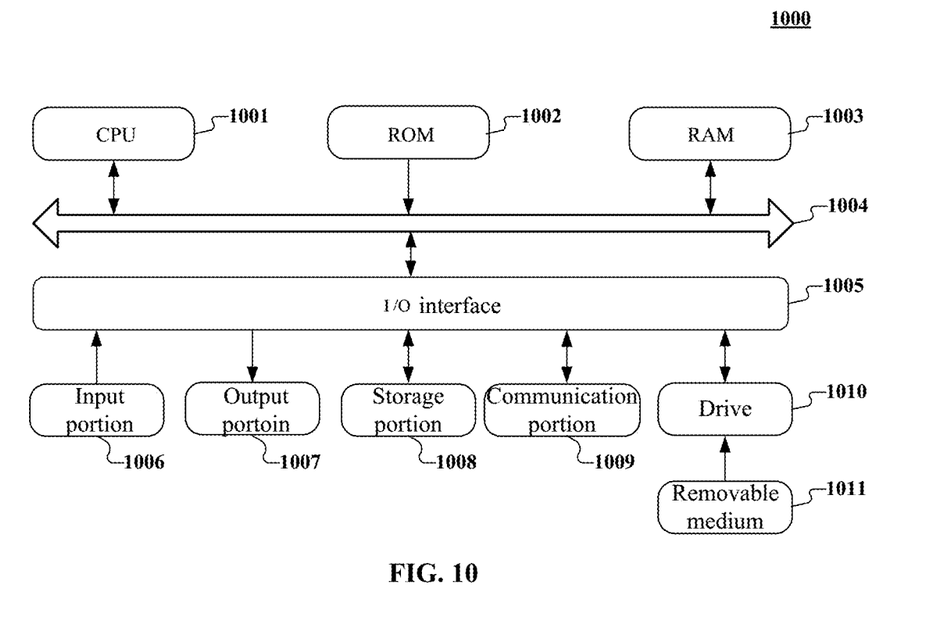
FIG. 10 is a schematic diagram of a structure of a computer system suitable for implementing a terminal device or a server according to an embodiment of the invention.

Reference is now made to FIG. 10 which shows a schematic diagram of a structure of a computer system 1000 suitable for implementing a terminal device or a server according to an embodiment of the invention. The terminal device shown in FIG. 10 is only an example, and shall not impose any limitation on the functions and the scope of use of the embodiment of the invention.

As shown in FIG. 10, the computer system 1000 includes a central processing unit (CPU) 1001, which may perform various appropriate actions and processes according to a program stored in a read-only memory (ROM) 1002 or a program loaded from a storage portion 1008 into a random access memory (RAM) 1003. Various programs and data required for the operation of the system 1000 are also stored in the RAM1003. The CPU 1001, the ROM 1002 and the RAM 1003 are connected to each other through a bus 1004. An input/output (I/O) interface 1005 is also connected to the bus 1004.

The following components are connected to the I/O interface 1005: an input portion 1006 including a keyboard, a mouse, and so on; an output portion 1007 including a cathode ray tube (CRT), a liquid crystal display (LCD) and so on, and a speaker and so on; a storage portion 1008 including a hard disk and so on; and a communication portion 1009 including a network interface card such as a LAN card, a modem, and so on. The communication portion 1009 performs communication processing via a network such as the Internet. A drive 1010 is also connected to the I/O interface 1005 according to requirements. A removable medium 1011, such as a magnetic disk, an optical disk, a magneto-optical disk, a semiconductor memory, and so on, is installed on the drive 1010 according to requirements so that a computer program read therefrom is installed in the storage portion 1008 according to requirements.

In particular, according to the embodiment disclosed in the invention, the process described above with reference to the flowchart may be implemented as a computer software program. For example, the embodiment of the invention includes a computer program product, which includes a computer program carried on a computer-readable medium, the computer program containing a program code for performing the method shown in the flowchart. In such embodiment, the computer program may be downloaded and installed from the network through the communication portion 1009, and/or installed from the removable medium 1011. When the computer program is executed by the central processing unit (CPU) 1001, the above functions defined in the system according to the invention are executed.

It shall be noted that the computer-readable medium shown in the invention may be a computer-readable signal medium or a computer-readable storage medium or any combination of the above two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the invention, the computer-readable storage medium may be any tangible medium containing or storing a program, and the program may be used by or in combination with an instruction execution system, apparatus or device. In the invention, the computer-readable signal medium may include a data signal propagated in a baseband or propagated as a part of a carrier wave, in which a computer-readable program code is carried. Such propagated data signal may adopt multiple forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program used by or in combination with the instruction execution system, apparatus or device. The program code contained on the computer-readable medium may be transmitted using any appropriate medium, including but not limited to wireless, wire, optical cable, RF, and so on, or any suitable combination thereof.

The flowcharts and block diagrams in the figures illustrate architectures, functions and operations that may be implemented by systems, methods and computer program products according to various embodiments of the invention. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules described in the embodiment of the invention may be implemented by software or hardware. The described modules may be also provided in a processor. For example, descriptions may be made as follows: a processor comprises an acquiring module, an index constructing module, a preliminary screening module, and a processing module. The names of these modules do not form limitations of the modules themselves in some cases. For example, the acquiring module can be also described as a "module for acquiring at least two types of spatial data sets".

As another aspect, the invention also provides a computer-readable medium, which may be included in the devices described in the above embodiment, or may exist independently without being assembled into the devices. The above computer-readable medium carries one or more programs, and the one or more programs, when executed by one of the devices, cause the device to include: acquiring at least two types of spatial data sets; constructing spatial indexes for the spatial data sets; constructing spatial geometric groups in accordance with the spatial indexes and the at least two types of spatial data sets; and placing the spatial geometric groups into a message queue, and subjecting the spatial geometric groups to a spatial correlation calculation by idle threads, which are threads for processing spatial data in the spatial data sets.

According to the technical solution of the embodiment of the invention, by constructing spatial indexes and spatial geometric groups for at least two types of spatial data sets, a comparison of the spatial geometric objects composed of the spatial data included in different spatial data sets in pairs is avoided, and then by placing the spatial geometric groups into a message queue, and subjecting the spatial geometric groups to a spatial correlation calculation by idle threads among a plurality of threads for processing spatial data, the idle threads are made to actively acquire the spatial geometric groups to avoid a problem of unbalanced calculation allocations to different threads, which can effectively balance calculation resources, reduce consumption of the calculation resources, and meanwhile improve a processing efficiency of spatial data.

The above specific implementation modes do not form limitations on the scope of protection of the invention. It shall be understood by those skilled in the art that various modifications, combinations, sub-combinations and substitutions may occur depending on design requirements and other factors. Any modification, equivalent replacement, improvement, and so on made within the spirit and principle of the invention shall be included in the scope of protection of the invention.

The invention claimed is:

1. A method for spatial data processing, the method is performed by a server and characterized by comprising:
    acquiring at least two types of spatial data sets;
    constructing spatial indexes for the spatial data sets by
        selecting a target spatial data set from the at least two types of spatial data sets; and
        constructing a multi-level spatial index for the target spatial data set, wherein constructing the multi-level spatial index includes:
            constructing virtual circumscribed rectangles for the spatial data included in the target spatial data set, the virtual circumscribed rectangles constructed based on maximum and minimum values of the spatial geometric objects, and
            cyclically performing step S1 and step S2 below:
    S1: constructing new virtual circumscribed rectangles for the plurality of virtual circumscribed rectangles in accordance with distances between the respective virtual circumscribed rectangles;
    S2: determining whether the new virtual circumscribed rectangles satisfy a cycle stop condition, and if so, constructing the multi-level spatial index using the respective constructed virtual circumscribed rectangles and new virtual circumscribed rectangles, otherwise using the new virtual circumscribed rectangles as the virtual circumscribed rectangles, and performing the step S1;
    wherein, the cycle stop condition comprises:
        the number of the new virtual circumscribed rectangles being not greater than a preset number threshold;
        or,
        the number of layers of the existing virtual circumscribed rectangles satisfying requirements of the multi-level spatial index;
    constructing spatial geometric groups in accordance with the spatial indexes and the at least two types of spatial data sets; and
    placing the spatial geometric groups into a message queue, and subjecting the spatial geometric groups to a spatial correlation calculation by using idle threads subscribed to the message queue to actively acquire the spatial geometric groups, which are threads for processing spatial data in the spatial data sets,
    wherein the method further comprises determining the thread count for processing the spatial data in accordance with the number of the spatial geometric groups, wherein the thread count is less than the number of the spatial geometric groups.

2. The method of claim 1, characterized in that
    each node included in the multi-level spatial index includes a pointer to the enclosed spatial data; and
    the step for constructing spatial geometric groups comprises:
        for other spatial data sets than the target spatial data set:
            searching a target node overlapping with the other spatial data sets in the multi-level spatial index;
            calling the spatial data corresponding to the target node by using the pointer of the target node; and
            combining the spatial data corresponding to the target node and the spatial data related to the target node in the other spatial data sets to form the spatial geometric groups.

3. The method of claim 1, characterized in that the method further comprises:
    storing the calculation results of the spatial geometric groups in a result storage container; and
    determining a location and/or distribution of a target to be analyzed included in the spatial data based on the calculation results stored in the result storage container.

4. The method of claim 1, characterized in that
    the spatial data included in the target spatial data set is two-dimensional data or three-dimensional data.

5. An electrode device, characterized by comprising:
    one or more processors; and
    a non-transitory computer readable medium storing one or more programs,
    the one or more programs, when executed by the one or more processors, causing the one or more processors to:
        acquire at least two types of spatial data sets;
        construct spatial indexes for the spatial data sets by
            selecting a target spatial data set from the at least two types of spatial data sets; and
            constructing a multi-level spatial index for the target spatial data set,
        wherein constructing the multi-level spatial index includes:
            constructing virtual circumscribed rectangles for the spatial data included in the target spatial data set, the virtual circumscribed rectangles are constructed based on maximum and minimum values of the spatial geometric objects, and cyclically performing step S1 and step S2 below:

S1: constructing new virtual circumscribed rectangles for the plurality of virtual circumscribed rectangles in accordance with distances between the respective virtual circumscribed rectangles;

S2: determining whether the new virtual circumscribed rectangles satisfy a cycle stop condition, and if so, constructing the multi-level spatial index using the respective constructed virtual circumscribed rectangles and new virtual circumscribed rectangles, otherwise using the new virtual circumscribed rectangles as the virtual circumscribed rectangles, and performing the step S1;

wherein, the cycle stop condition comprises:

the number of the new virtual circumscribed rectangles being not greater than a preset number threshold;

or, the number of layers of the existing virtual circumscribed rectangles satisfying requirements of the multi-level spatial index;

construct spatial geometric groups in accordance with the spatial indexes and the at least two types of spatial data sets; and place the spatial geometric groups into a message queue, and subjecting the spatial geometric groups to a spatial correlation calculation by using idle threads subscribed to the message queue to actively acquire the spatial geometric groups, which are threads for processing spatial data in the spatial data sets, wherein the one or more programs, when executed by the one or more processors, further cause the one or more processors to determine the thread count for processing the spatial data in accordance with the number of the spatial geometric groups, wherein the thread count is less than the number of the spatial geometric groups.

6. A non-transitory computer-readable medium, on which a computer program is stored, characterized in that the program, when executed by a processor, implements a set of functions comprising:

acquiring at least two types of spatial data sets;

constructing spatial indexes for the spatial data sets by selecting a target spatial data set from the at least two types of spatial data sets; and constructing a multi-level spatial index for the target spatial data set, wherein constructing the multi-level spatial index includes:

constructing virtual circumscribed rectangles for the spatial data included in the target spatial data set, the virtual rectangles constructed based on maximum and minimum values of the spatial geometric objects, cyclically performing step S1 and step S2 below:

S1: constructing new virtual circumscribed rectangles for the plurality of virtual circumscribed rectangles in accordance with distances between the respective virtual circumscribed rectangles;

S2: determining whether the new virtual circumscribed rectangles satisfy a cycle stop condition, and if so, constructing the multi-level spatial index using the respective constructed virtual circumscribed rectangles and new virtual circumscribed rectangles, otherwise using the new virtual circumscribed rectangles as the virtual circumscribed rectangles, and performing the step S1;

wherein, the cycle stop condition comprises:

the number of the new virtual circumscribed rectangles being not greater than a preset number threshold;

or the number of layers of the existing virtual circumscribed rectangles satisfying requirements of the multi-level spatial index;

constructing spatial geometric groups in accordance with the spatial indexes and the at least two types of spatial data sets; and placing the spatial geometric groups into a message queue, and subjecting the spatial geometric groups to a spatial correlation calculation by using idle threads subscribed to the message queue to actively acquire the spatial geometric groups, which are threads for processing spatial data in the spatial data sets, wherein the set of functions further comprises determining the thread count for processing the spatial data in accordance with the number of the spatial geometric groups, wherein the thread count is less than the number of the spatial geometric groups.

\* \* \* \* \*